(12) United States Patent
Montgomery et al.

(10) Patent No.: US 10,539,210 B2
(45) Date of Patent: Jan. 21, 2020

(54) ANGULAR CONTACT BALL RAMPS FOR DRIVEN TURBOCHARGER

(71) Applicant: SuperTurbo Technologies, Inc., Loveland, CO (US)

(72) Inventors: Marc Montgomery, Loveland, CO (US); Ryan Sherill, Loveland, CO (US)

(73) Assignee: SuperTurbo Technologies, Inc., Loveland, CO (US)

( * ) Notice: Subject to any disclaimer, the term of this patent is extended or adjusted under 35 U.S.C. 154(b) by 101 days.

(21) Appl. No.: 15/702,634

(22) Filed: Sep. 12, 2017

(65) Prior Publication Data

US 2018/0106347 A1    Apr. 19, 2018

Related U.S. Application Data

(60) Provisional application No. 62/407,880, filed on Oct. 13, 2016.

(51) Int. Cl.
| | |
|---|---|
| *F16H 13/08* | (2006.01) |
| *F02B 37/10* | (2006.01) |
| *F02B 39/04* | (2006.01) |

(52) U.S. Cl.
CPC ........... *F16H 13/08* (2013.01); *F02B 37/105* (2013.01); *F02B 39/04* (2013.01); *Y02T 10/144* (2013.01)

(58) Field of Classification Search
CPC ......... F02B 37/00–24; F02B 39/04–06; Y02T 10/144; F16H 13/06; F16H 13/08
See application file for complete search history.

(56) References Cited

U.S. PATENT DOCUMENTS

| | | | | |
|---|---|---|---|---|
| 2,886,986 A | * | 5/1959 | Kopp ..................... | F16H 15/18 475/194 |
| 4,617,838 A | * | 10/1986 | Anderson ............... | F16H 13/08 475/195 |
| 8,561,403 B2 | | 10/2013 | VanDyne et al. | |
| 8,668,614 B2 | | 3/2014 | Sherrill et al. | |
| 9,217,363 B2 | | 12/2015 | Riley et al. | |
| 9,581,078 B2 | | 2/2017 | Brinks et al. | |
| 9,670,832 B2 | | 6/2017 | Sherrill et al. | |
| 2008/0039268 A1 | * | 2/2008 | Stanovskoy ............. | F16H 25/06 476/36 |
| 2010/0199666 A1 | * | 8/2010 | VanDyne ............... | F02B 37/105 60/605.2 |
| 2011/0150383 A1 | * | 6/2011 | Yoshida .................. | F16C 23/08 384/590 |

(Continued)

FOREIGN PATENT DOCUMENTS

| | | |
|---|---|---|
| CN | 2010800658285 | 12/2015 |
| WO | 2011/096936 A1 | 8/2011 |

*Primary Examiner* — Laert Dounis
(74) *Attorney, Agent, or Firm* — William W. Cochran; Cochran Freund & Young LLC (57) ABSTRACT

Disclosed is a planetary traction drive for a driven turbocharger that utilizes angular contact ball ramps to provide variable clamping depending on torque throughput. The ball ramps are located between ring rollers and a ring gear, and function to locate the ring gear concentrically to the ring rollers. The angled contact axes of the ball ramps allows use of a low conformity contact between the balls and ball races in the ball ramps to provide efficient movement, while simultaneously locating ring gear concentrically to the traction rings.

13 Claims, 5 Drawing Sheets

(56) References Cited

U.S. PATENT DOCUMENTS

| | | | |
|---|---|---|---|
| 2012/0165151 A1* | 6/2012 | Sherrill | F02D 41/0007 |
| | | | 475/114 |
| 2013/0017920 A1* | 1/2013 | Sherrill | F16H 13/10 |
| | | | 475/183 |
| 2016/0061308 A1* | 3/2016 | Oishi | F16H 49/001 |
| | | | 74/640 |

* cited by examiner

Fig 5

ANGULAR CONTACT BALL RAMPS FOR DRIVEN TURBOCHARGER

BACKGROUND

Driven turbochargers are an improvement over normal turbochargers since driven turbochargers (super-turbochargers) are powered by more than just the exhaust gas turbine, which reduces turbo-lag in boosted engines. Driven turbochargers can also direct excess turbine power back to the engine to increase engine efficiency.

SUMMARY

An embodiment of the present invention may therefore comprise a driven turbocharger for an engine comprising: a turbo shaft; a compressor connected to a first location on the turbo shaft; a turbine connected to a second location on the turbo shaft; a planetary traction drive that interfaces with the turbo shaft to transmit power to and from the turbo shaft, the planetary traction drive comprising: a plurality of planet rollers that interface with the turbo shaft; a first ring roller and a second ring roller that interface with slanted traction surfaces on the plurality of planet rollers; a ring gear positioned centrally that interfaces with the first ring roller and the second ring roller through a first angular contact ball ramp and a second angular contact ball ramp, such that the first angular contact ball ramp and the second angular contact ball ramp increase clamping forces in the planetary traction drive when torque through the ring gear increases, where the first angular contact ball ramp and the second angular contact ball ramp are comprised of a plurality of balls in ball races with angled contact axes and are shaped to have a low conformity of the balls in the ball races to provide high efficiency movement of the balls in the ball races, and the angled contact axes locate the ring gear concentrically to the first ring roller and the second ring roller; a transfer gear that meshes with the ring gear that transfers power to and from the engine through a transmission.

An embodiment of the present invention may therefore further comprise a method of providing clamping forces in a planetary traction drive comprising: providing a sun shaft; interfacing a plurality of planet rollers to the sun shaft; interfacing a first ring roller and a second ring roller to the plurality of planet rollers through slanted traction surfaces on the plurality of planet rollers; providing a ring gear centrally located between the first ring roller and the second ring roller; coupling the ring gear to the first ring roller through a first angular contact ball ramp, and to the second ring roller through a second angular contact ball ramp such that the first angular contact ball ramp and the second angular contact ball ramp increase clamping forces in the planetary traction drive when torque through the ring gear increases, where the first angular contact ball ramp and the second angular contact ball ramp are comprised of a plurality of balls in ball races with angled contact axes and are shaped to have a low conformity of the balls in the ball races to provide high efficiency movement of the balls in the ball races, and the angled contact axes locate the ring gear concentrically to the first ring roller and the second ring roller.

An embodiment of the present invention may therefore further comprise a planetary traction drive comprising: a sun shaft; a plurality of planet rollers that interface with the sun shaft; a first ring roller and a second ring roller that interface with slanted traction surfaces on the plurality of planet rollers; a ring gear positioned centrally that interfaces with the first ring roller and the second ring roller through a first angular contact ball ramp and a second angular contact ball ramp, such that the first angular contact ball ramp and the second angular contact ball ramp increase clamping forces in the planetary traction drive when torque through the ring gear increases, where the first angular contact ball ramp and the second angular contact ball ramp are comprised of a plurality of balls in ball races with angled contact axes and are shaped to have a low conformity of the balls in the ball races to provide high efficiency movement of the balls in the ball races, and the angled contact axes locate the ring gear concentrically to the first ring roller and the second ring roller.

DETAILED DESCRIPTION OF THE EMBODIMENTS

Figure 1:
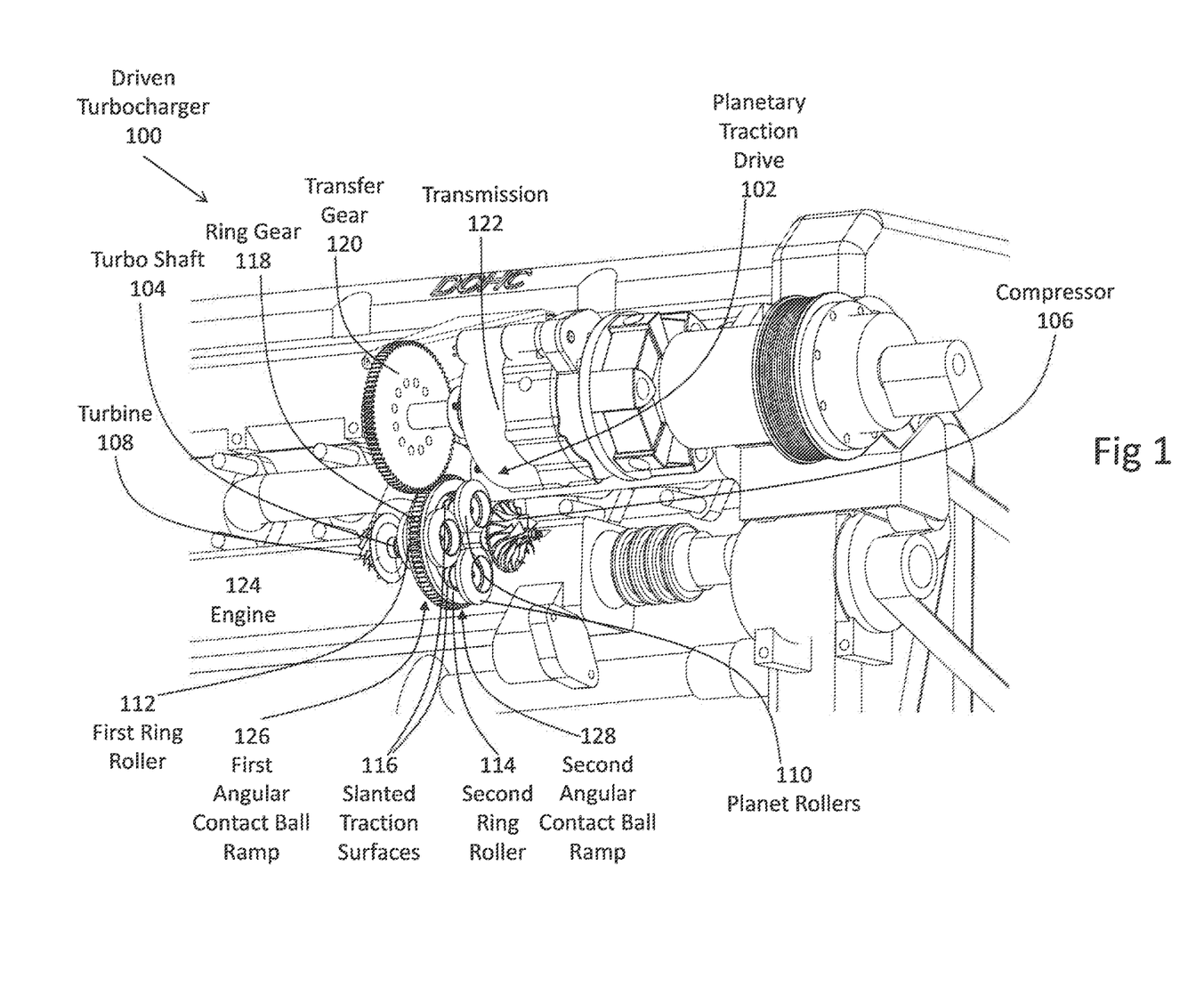
FIG. 1 is an isometric view of a driven turbocharger with a planetary traction drive.

FIG. 1 is an isometric view of a driven turbocharger 100 with a planetary traction drive 102. Turbo shaft 104 is connected to compressor 106 and turbine 108. Planetary traction drive 102 interfaces with turbo shaft 104 to transmit power to and from turbo shaft 104. Planetary traction drive 102 is composed of a plurality of planet rollers 110 that interface with turbo shaft 104, a first ring roller 112 and a second ring roller 114 that interface with slanted traction surfaces 116 on planet rollers 110, and a ring gear 118. Ring gear 118 meshes with transfer gear 120, which in turn is coupled to transmission 122. Transmission 122 transmits power between engine 124 and planetary traction drive 102. Ring gear 118 interfaces with first ring roller 112 and second ring roller 114 through first angular contact ball ramp 126 and second angular contact ball ramp 128. When torque is applied to ring gear 118, first angular contact ball ramp 126 and second angular contact ball ramp 128 push first ring roller 112 and second ring roller 114 away from ring gear 118. This, in turn, increases normal forces on slanted traction surfaces 116 of planet rollers 110, and increases clamping forces in planetary traction drive 102. The increased clamping force increases the torque capacity of planetary traction drive 102 with increased levels of torque throughput, so that the efficiency and life characteristics of planetary traction drive 102 are improved. During high torque transmission operation, first angular contact ball ramp 126 and second angular contact ball ramp 128 provide a high level of clamping force in planetary traction drive 102 to prevent slip, and during low torque transmission operation, first angular contact ball ramp 126 and second angular contact ball ramp 128 relax the clamping force in planetary traction drive 102 to improve the life and efficiency of planetary traction drive 102.

The operation of driven turbocharger 100 is as taught in U.S. Pat. No. 8,561,403, issued Oct. 22, 2013, entitled "Super-Turbocharger Having a High Speed Traction Drive and a Continuously Variable Transmission," U.S. Pat. No. 8,668,614, issued Mar. 11, 2014, entitled "High Torque Traction Drive," U.S. Pat. No. 8,608,609, issued Dec. 17, 2013, entitled "Symmetrical Traction Drive," and U.S. Pat. No. 9,670,832 issued Jun. 6, 2017, entitled "Thrust Absorbing Planetary Traction Drive Superturbo." U.S. Pat. Nos. 8,561,403, 8,668,614, 8,608,609 and 9,670,832, are specifically incorporated herein by reference for all that they disclose and teach.

Figure 2:
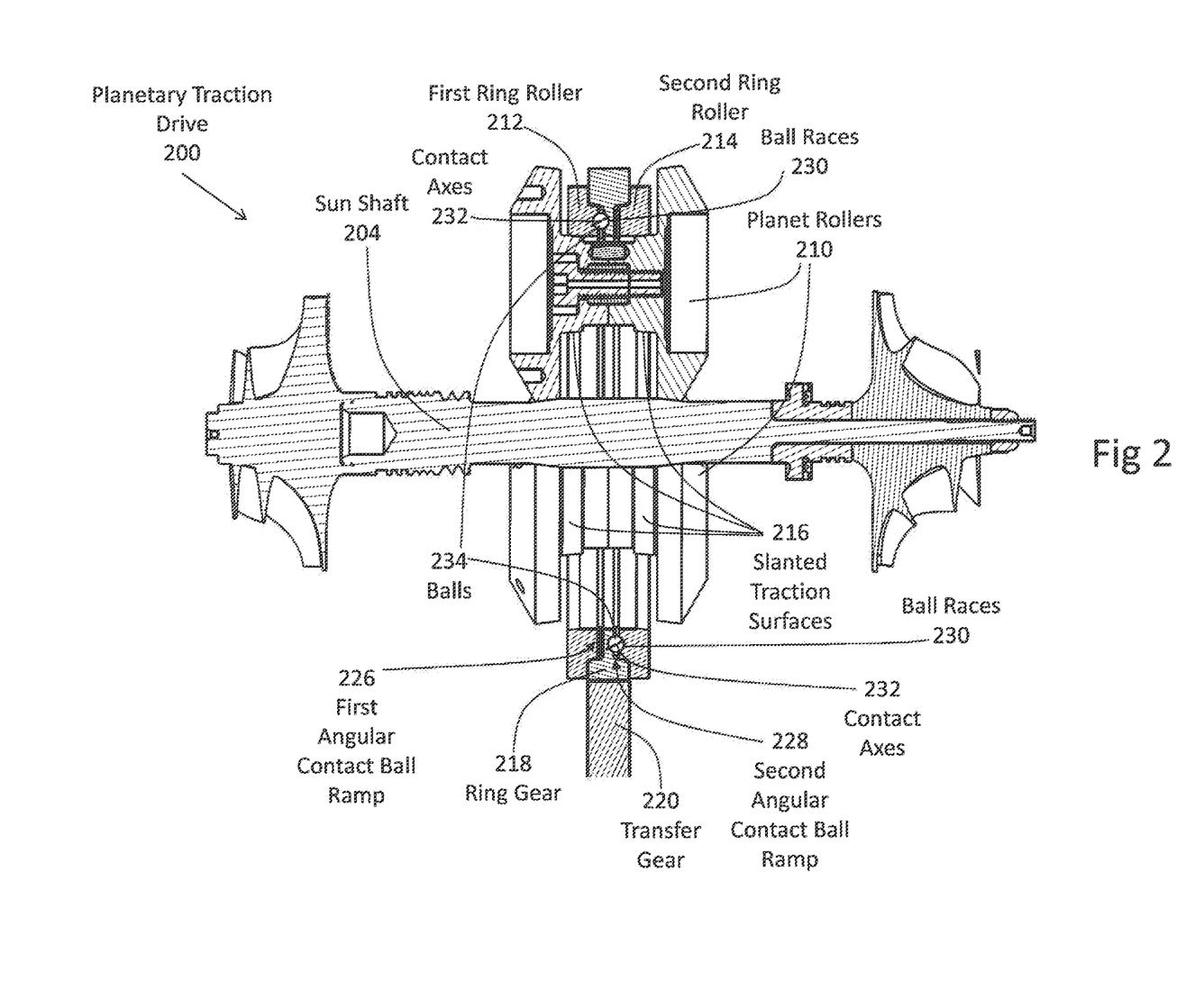
FIG. 2 is a cross section of an embodiment of a planetary traction drive with angular contact ball ramps.

FIG. 2 is a cross section of an embodiment of a planetary traction drive 200 with angular contact ball ramps 226, 228. When torque is applied to ring gear 218, first angular contact ball ramp 226 and second angular contact ball ramp 228 push first ring roller 212 and second ring roller 214 away from ring gear 218, which increases normal forces on slanted traction surfaces 216 of planet rollers 210, providing increased clamping forces to planetary traction drive 200 to increase its torque capacity. The normal forces between planet rollers 210 and sun shaft 204 are also increased. Sun shaft 204 corresponds to turbo shaft 104 in FIG. 1. Ball races 230 of first angular contact ball ramp 226 and second angular contact ball ramp 228 are slanted in two directions, so that they operate with torque in either direction through planetary traction drive 200. Ring gear 218 meshes with transfer gear 220 to transmit power to and from planetary traction drive 200. Ring gear 218 is entirely located through first angular contact ball ramp 226 and second angular contact ball ramp 228, and has no additional support bearings, so it is necessary that first angular contact ball ramp 226 and second angular contact ball ramp 228 maintain ring gear 218 concentric to first ring roller 212 and second ring roller 214, both for balanced rotation of ring gear 218 and to maintain proper meshing of ring gear 218 and transfer gear 220. First angular contact ball ramp 226 and second angular contact ball ramp 228 are comprised of a plurality of balls 234 located in a plurality of ball races 230. Contact axes 232 of first angular contact ball ramp 226 and second angular contact ball ramp 228, where balls 234 contact ball races 230, are angled with components in both the axial and radial directions. This constrains ring gear 218 to a proper, concentric location, even with point contacts between balls 234 and ball races 230, which allows for low conformity between balls 234 and ball races 230, where the radius of curvature of ball races 230 is larger than the radius of balls 234. This low conformity is beneficial for first angular contact ball ramp 226 and second angular contact ball ramp 228, as it reduces rolling friction of balls 234 in ball races 230, increasing the efficiencies of first angular contact ball ramp 226 and second angular contact ball ramp 228, and providing more linear clamping of planetary traction drive 200. If contact axes 232 were not angled, and were purely in an axial direction, very high conformity of balls 234 in ball races 230 would be necessary to hold ring gear 218 concentric to first ring roller 212 and second ring roller 214, which would increase friction, lower efficiency, and increase wear in the ball ramps. Additionally, the low conformity of balls 234 in ball races 230 allows balls 234 to have a range of diameters while still providing proper function to first angular contact ball ramp 226 and second angular contact ball ramp 228. The diameter of balls 234 can be adjusted to compensate for a range of tolerances of parts in planetary traction drive 200, and can be used to set a desired preload of normal forces on slanted traction surfaces 216 of planet rollers 210.

Figure 3:
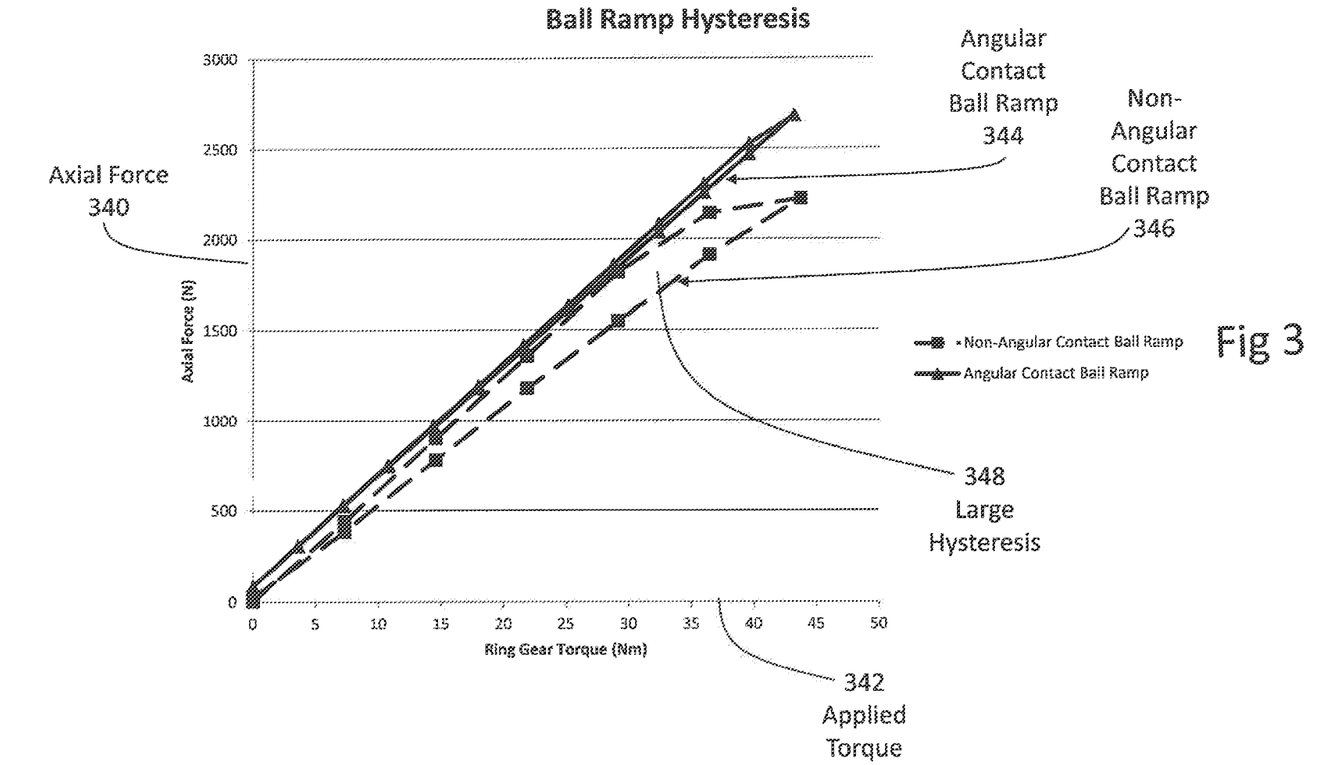
FIG. 3 is a plot of axial force vs. applied torque for an angular contact ball ramp and a non-angular contact ball ramp.

FIG. 3 is a plot of axial force 340 vs. applied torque 342 for an angular contact ball ramp 344 and a non-angular contact ball ramp 346. The non-angular contact ball ramp 346 has high conformity races necessary to locate ring gear 218 from FIG. 2. Because of this high conformity, the non-angular contact ball ramp 346 has a high amount of friction as it is loaded. This leads to lower performance, as seen by the lower slope of axial force 340 to applied torque 342, as well as large hysteresis 348 when the non-angular contact ball ramp 346 is unloaded. This large hysteresis 348 results in over-clamping of the planetary traction drive 200 from FIG. 2 during some operating conditions, lowering the efficiency and life of the planetary traction drive 200. The angular contact ball ramp 344 has lower conformity races, as the angular contact axes provide the necessary alignment of ring gear 218. This allows for low rolling friction and high efficiency in angular contact ball ramp 344. As a result, the performance of angular contact ball ramp 344 is higher, with very little hysteresis, so the clamping force on planetary traction drive 200 is more consistent, leading to higher efficiency and life of planetary traction drive 200.

Figure 4:
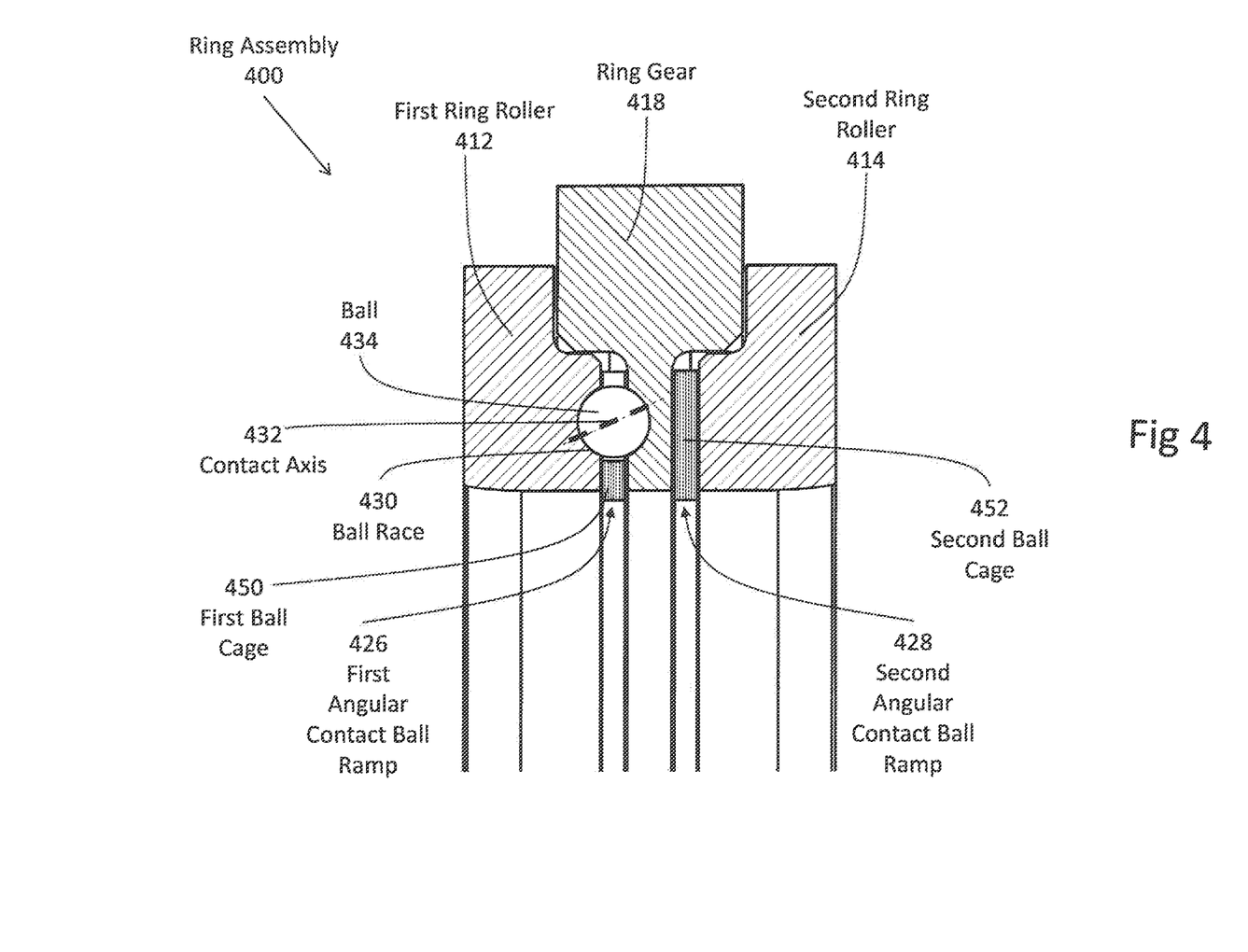
FIG. 4 is a zoomed-in cross section of an embodiment of a ring assembly for the planetary traction drive of FIG. 2.

FIG. 4 is a zoomed-in cross section of an embodiment of a ring assembly 400 for the planetary traction drive 200 of FIG. 2. Ring gear 418 is centrally located, with first ring roller 412 and second ring roller 414 located on each side. First angular contact ball ramp 426 and second angular contact ball ramp 428 couple first ring roller 412 and second ring roller 414 to ring gear 418, and force first ring roller 412 and second ring roller 414 away from ring gear 418 when torque is applied to ring gear 418. Shown is a single ball 434 in a ball race 430 of first angular contact ball ramp 426 of the plurality of balls in ball races for both first angular contact ball ramp 426 and second angular contact ball ramp 428. Contact axis 432 of ball 434 in ball race 430 is angled, so that contact axis 432 has components in both the radial and axial directions. This allows for ring gear 418 to be held concentrically to first ring roller 412 and second ring roller 414 by first angular contact ball ramp 426 and second angular contact ball ramp 428, while allowing a lower conformity of ball 434 in ball race 430. Also shown are first ball cage 450 and second ball cage 452, which may be used to help locate the balls such as ball 434 in first angular contact ball ramp 426 and second angular contact ball ramp 428. As can be seen, the ball races, such as ball race 430, of first angular contact ball ramp 426 and second angular contact ball ramp 428 are staggered on ring gear 418, so that forces on ring gear 418 from first angular contact ball ramp 426 and second angular contact ball ramp 428 are distributed more evenly, and thinner material can be used.

Figure 5:
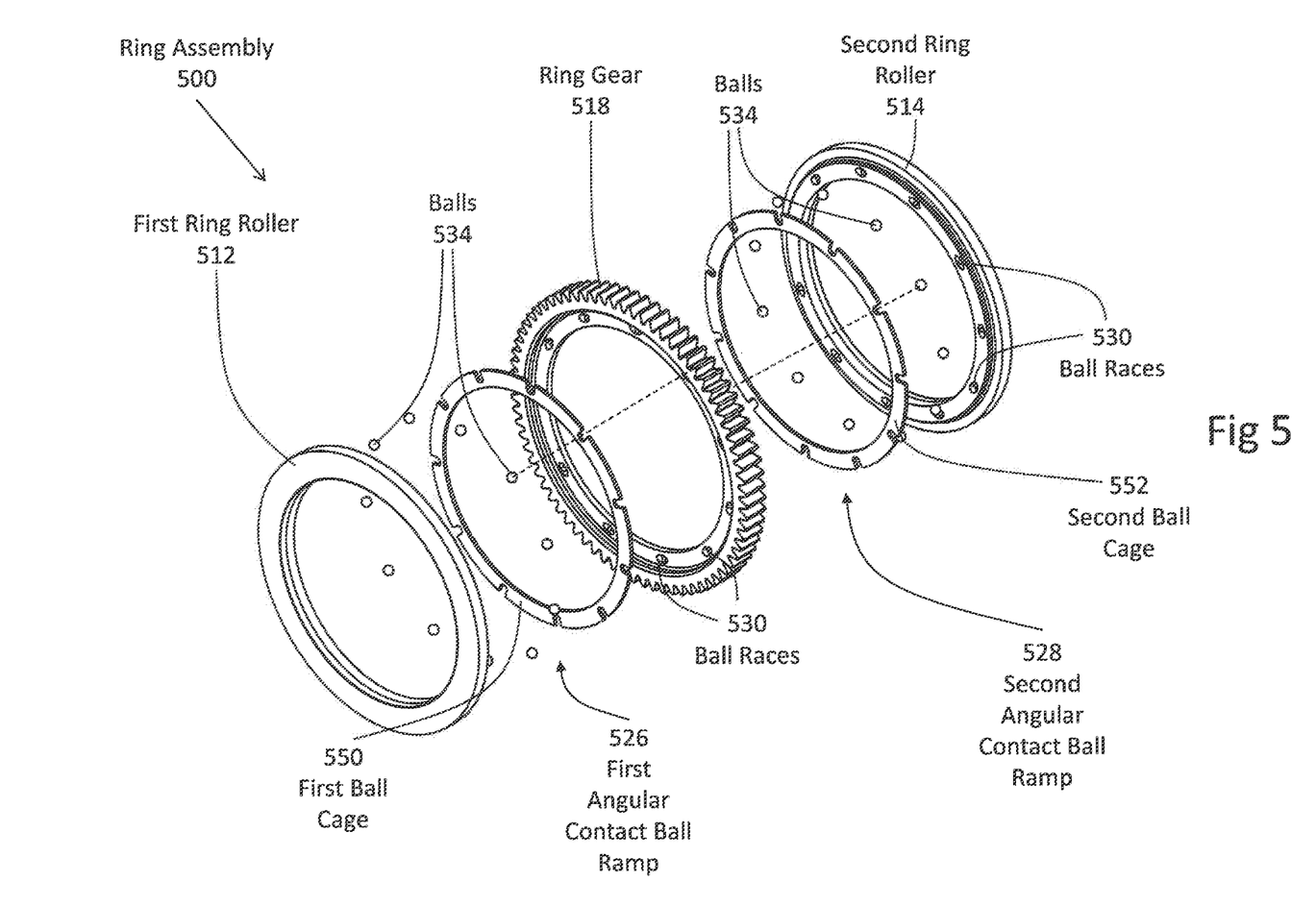
FIG. 5 is an exploded view of an embodiment of a ring assembly for the planetary traction drive of FIG. 2.

FIG. 5 is an exploded view of an embodiment of a ring assembly 500 for the planetary traction drive 200 of FIG. 2. First ring roller 512 and second ring roller 514 are located on opposite sides of ring gear 518, and interface to ring gear 518 through first angular contact ball ramp 526 and second angular contact ball ramp 528. Balls 534 are located in ball races 530, such that when torque is applied to ring gear 518, balls 534 roll in ball races 530 to force first ring roller 512 and second ring roller 514 away from ring gear 518. Additionally, first ball cage 550 and second ball cage 552 may be used to help locate balls 534 in first angular contact ball ramp 526 and second angular contact ball ramp 528. As shown, ball races 530 from first angular contact ball ramp 526 and second angular contact ball ramp 528 are staggered on ring gear 518, to even out forces on ring gear 518 from first angular contact ball ramp 526 and second angular contact ball ramp 528 and allow for use of thinner material.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A driven turbocharger for an engine comprising:
   a turbo shaft;
   a compressor connected to a first location on said turbo shaft;
   a turbine connected to a second location on said turbo shaft;
   a planetary traction drive that interfaces with said turbo shaft to transmit power to and from said turbo shaft, said planetary traction drive comprising:
      a plurality of planet rollers that interface with said turbo shaft;
      a first ring roller and a second ring roller that interface with slanted traction surfaces on said plurality of planet rollers;
      a ring gear positioned centrally that interfaces with said first ring roller and said second ring roller through a first angular contact ball ramp and a second angular contact ball ramp, such that a plurality of balls in said first angular contact ball ramp and said second angular contact ball ramp increase clamping forces in said planetary traction drive when torque through said ring gear increases, where;
         said first angular contact ball ramp and said second angular contact ball ramp are comprised of said plurality of balls in ball races with angled contact axes that are angled with directional components in both the axial and radial directions that constrain said ring gear concentrically to said first ring roller and said second ring roller;
      a transfer gear that meshes with said ring gear that transfers power to and from said engine through a transmission.

2. The driven turbocharger of claim 1 where said plurality of ball races of said first angular contact ball ramp are staggered from said plurality of ball races of said second angular contact ball ramp on said ring gear.

3. The driven turbocharger of claim 1 where a first ball cage and a second ball cage help locate said plurality of balls in said first angular contact ball ramp and said second angular contact ball ramp.

4. The driven turbocharger of claim 1 where diameters of said plurality of balls in said first angular contact ball ramp and said second angular contact ball ramp are selected to set a desired preload of normal forces on said slanted traction surfaces on said plurality of planet rollers.

5. A method of providing clamping forces in a planetary traction drive comprising:
   providing a sun shaft;
   interfacing a plurality of planet rollers to said sun shaft;
   interfacing a first ring roller and a second ring roller to said plurality of planet rollers through slanted traction surfaces on said plurality of planet rollers;
   providing a ring gear centrally located between said first ring roller and said second ring roller;
   coupling said ring gear to said first ring roller through a first angular contact ball ramp, and to said second ring roller through a second angular contact ball ramp such that a plurality of balls in said first angular contact ball ramp and said second angular contact ball ramp increase clamping forces in said planetary traction drive when torque through said ring gear increases, where;
      said first angular contact ball ramp and said second angular contact ball ramp are comprised of said plurality of balls in ball races with angled contact axes that are angled with directional components in both the axial and radial directions that constrain said ring gear concentrically to said first ring roller and said second ring roller.

6. The method of claim 5 where said plurality of ball races of said first angular contact ball ramp are staggered from said plurality of ball races of said second angular contact ball ramp on said ring gear.

7. The method of claim 5 further comprising:
   providing a first ball cage and a second ball cage to help locate said balls in said first angular contact ball ramp and said second angular contact ball ramp.

8. The method of claim 5 further comprising:
   connecting a turbine and a compressor to said sun shaft to form a turbo shaft;
   meshing said ring gear with a transfer gear that connects said planetary traction drive to a transmission that transmits power between said planetary traction drive and an engine to form a driven turbocharger.

9. The method of claim 5 where diameters of said plurality of balls in said first angular contact ball ramp and said second angular contact ball ramp are selected to set a desired preload of normal forces on said slanted traction surfaces on said plurality of planet rollers.

10. A planetary traction drive comprising:
    a sun shaft;
    a plurality of planet rollers that interface with said sun shaft;
    a first ring roller and a second ring roller that interface with slanted traction surfaces on said plurality of planet rollers;
    a ring gear positioned centrally that interfaces with said first ring roller and said second ring roller through a plurality of balls in a first angular contact ball ramp and a second angular contact ball ramp, such that plurality of balls in said first angular contact ball ramp and said second angular contact ball ramp increase clamping forces in said planetary traction drive when torque through said ring gear increases, where;
       said first angular contact ball ramp and said second angular contact ball ramp are comprised of said plurality of balls in ball races with angled contact axes that are angled with directional components in both the axial and radial directions that constrain said ring gear concentrically to said first ring roller and said second ring roller.

11. The planetary traction drive of claim 10 where said plurality of ball races of said first angular contact ball ramp are staggered from said plurality of ball races of said second angular contact ball ramp on said ring gear.

12. The planetary traction drive of claim 10 where a first ball cage and a second ball cage help locate said plurality of balls in said first angular contact ball ramp and said second angular contact ball ramp.

13. The planetary traction drive of claim 10 where diameters of said plurality of balls in said first angular contact ball ramp and said second angular contact ball ramp are selected to set a desired preload of normal forces on said slanted traction surfaces on said plurality of planet rollers.

\* \* \* \* \*

UNITED STATES PATENT AND TRADEMARK OFFICE
CERTIFICATE OF CORRECTION

PATENT NO. : 10,539,210 B2  
APPLICATION NO. : 15/702634  
DATED : January 21, 2020  
INVENTOR(S) : Montgomery et al.

Page 1 of 1

It is certified that error appears in the above-identified patent and that said Letters Patent is hereby corrected as shown below:

In the Claims

Column 6, Line 7: "hall ramp" should be "ball ramp"

Column 6, Line 9: "plurality of halls" should be "plurality of balls"

Column 6, Line 52: "plurality of halls" should be "plurality of balls"

Column 6, Line 60: "hall ramp" should be "ball ramp"

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*